Patented Nov. 29, 1949

2,489,518

UNITED STATES PATENT OFFICE 2,489,518

STABILIZED VINYL CHLORIDE RESINS

Samuel L. Burt, Plainfield, N. J., assignor to Bakelite Corporation, a corporation of New Jersey No Drawing. Application December 15, 1948,
Serial No. 65,522

7 Claims. (Cl. 260—45.75)

1

This invention relates to the stabilization of polymers or copolymers of vinyl chloride against deterioration caused by subjecting such polymers or copolymers to the influence of heat and light.

It has been found that the hydrocarbon tin alcoholates of monohydroxyl compounds containing at least three carbon atoms and at least one carbon to carbon double bond are superior stabilizers for vinyl chloride resins. Their superiority resides in the fact that such stabilizers are more soluble in vinyl chloride resins and plastic compositions of high clarity can be formulated from such stabilized vinyl resins. Also, the stabilizers, as a result of their greater solubility in or compatibility with the vinyl chloride resins, do not migrate to the surface of the molded or sheeted plastic composition and produce an unsightly appearance as do many commonly used stabilizers for vinyl chloride resins. Furthermore, plastic compositions stabilized with these tin alcoholates do not develop an unpleasant odor on exposure to air and sunlight, as do many of the present plastic compositions containing vinyl chloride resins. In addition to these properties, the new stabilizers inhibit discoloration of the stabilized composition on exposure to heat and light for a longer period than do most of the presently used stabilizers for vinyl chloride resins.

The hydrocarbon tin alcoholates of this invention may conveniently be represented by the formula:

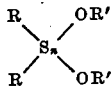

where R is an alkyl radical, such as methyl, ethyl, propyl, butyl or 2-ethylhexyl, or an aryl radical, such as phenyl or toluyl, and R' is the residue of a monohydroxyl compound containing at least one carbon to carbon double bond and having at least three carbon atoms. These monohydroxyl compounds may be grouped into the following classes:

| Olefinic Alcohols | Aromatic Alcohols | Phenols | Alcohols having Conjugated Double Bonds |
|---|---|---|---|
| Allyl alcohol | Benzyl alcohol | Phenol | Furfuryl alcohol |
| Crotonyl alcohol | Cinnamyl alcohol | Cresol | |
| Pentenyl alcohol | | Xylenol | |
| Hexenyl alcohol | | | |
| Cyclohexenyl alcohol | | | |

2

The dialkyl tin alcoholates of these monohydroxyl compounds may be made by conventional methods or by the improved process described in my copending application, Serial No. 65,521 "Hydrocarbon tin alcoholates," filed December 15, 1948.

The vinyl chloride resins which may be stabilized with the new stabilizers include polyvinyl chloride and copolymers of vinyl chloride with other polymerizable olefinic compounds, such as vinyl acetate, vinyl propionate, ethyl acrylate, dibutyl maleate, diethyl fumarate, vinylidene chloride, vinyl fluoride and ethylene. Usually the vinyl chloride predominates in such copolymers and may be 60% or more of the copolymer. Copolymers of vinyl chloride with vinyl acetate containing 60 to 99% of the vinyl chloride are among the most widely used vinyl chloride resins, and the new stabilizers are of particular value in improving the stability of these copolymers.

The period during which compositions containing vinyl chloride resins and the stabilizers of this invention remain free of color on exposure to heat or light depends on the amount of stabilizer used. In general, this amount will vary from 0.5 to 5% by weight of the resin, depending on the ultimate use of the product. In many cases, plasticizers, pigments, dyes, lubricants and other ingredients will be combined with the vinyl chloride resins in addition to the stabilizers.

Heat stability data were determined for copolymers of vinyl chloride and vinyl acetate having 95% vinyl chloride and containing various amounts of different stabilizers. For comparison, data is included on a dialkyl tin alcoholate of a saturated alcohol.

The test formulas used were as follows:

| | A | B | C |
|---|---|---|---|
| | Per cent | Per cent | Per cent |
| Vinyl chloride-acetate copolymer, 95% chloride | 64.5 | 63.5 | 62.5 |
| Di (2-ethylhexyl) phthalate | 35.0 | 35.0 | 35.0 |
| Stearic acid | 0.5 | 0.5 | 0.5 |
| Stabilizer | | 1.0 | 2.0 |
| | 100.0 | 100.0 | 100.0 |

The above compositions were fluxed on a two-roll mill at 145 to 155° C. for approximately three minutes. Discs were cut from the resulting sheets and placed in an oven at 158° C. for various times up to five hours. On cooling, the discs were placed against a white magnesium oxide block and the reflectance of blue light was measured by a photometer. The instrument was adjusted to read 100% as the reflectance of the magnesium oxide block, and gave a reading of 95% for a perfectly colorless transparent material.

Thus, compositions containing the better stabilizers will give higher reflectance readings and can be heated longer before a significant decrease in the reflectance occurs. In the table below, "Original reflectance" is that of the milled sheet before exposure to the oven heat. "Hours to 60% reflectance" is the number of hours in the oven necessary to reduce the reflectance to 60%. This represents a slight yellowing of the plastic. "Hours to 15% reflectance" is the number of hours of heating at the oven temperature of 158° C. to reduce the reflectance to 15%. This represents a yellow to brown discoloration.

The heat stability data is tabulated below:

| Stabilizer | Per cent in Compound | Original Reflectance, Per cent | Hours to 60% Reflectance | Hours to 15% Reflectance |
| --- | --- | --- | --- | --- |
| Dibutyl tin alcoholate of— | | | | |
| No Stabilizer | | 74 | 0.1 | 0.5 |
| Allyl alcohol | 1 | 80 | 1.3 | 4.7 |
| Benzyl alcohol | 1 | 82 | 1.7 | 4.2 |
| Furfuryl alcohol | 2 | 75 | 2.1 | over 5 |
| n-Butanol | 1 | 80 | 1.3 | 3.4 |
| | 2 | 78 | 1.3 | 3.8 |

What is claimed is:

1. A composition containing a vinyl resin including vinyl chloride polymerized therein and a heat stabilizer therefor comprising a dialkyl tin dialcoholate of a monohydroxyl compound containing at least one carbon to carbon double bond and at least three carbon atoms.

2. A composition containing a vinyl resin including vinyl chloride polymerized therein and a heat stabilizer therefor comprising a dialkyl tin dialcoholate of an aromatic monohydric alcohol.

3. A composition containing a vinyl resin including vinyl chloride polymerized therein and a heat stabilizer therefor comprising a dialkyl tin dialcoholate of an olefinic monohydric alcohol.

4. A composition containing a vinyl resin including vinyl chloride polymerized therein and a heat and light stabilizer therefor comprising a dialkyl tin dialcoholate of a monohydric alcohol having a pair of conjugated olefinic double bonds.

5. A vinyl chloride resin containing from 60 to 100% vinyl chloride polymerized therein, admixed with from 0.5 to 5% by weight thereof of the dibutyl tin dialcoholate of furfuryl alcohol.

6. A vinyl chloride resin containing from 60 to 100% vinyl chloride polymerized therein admixed with from 0.5 to 5% by weight thereof of the dibutyl tin dialcoholate of benzyl alcohol.

7. A vinyl chloride resin containing from 60 to 100% vinyl chloride polymerized therein admixed with from 0.5 to 5% by weight thereof of the dibutyl tin dialcoholate of allyl alcohol.

SAMUEL L. BURT.

REFERENCES CITED

The following references are of record in the file of this patent:

UNITED STATES PATENTS

| Number | Name | Date |
| --- | --- | --- |
| 2,189,417 | Craig | Feb. 6, 1940 |
| 2,463,573 | Stanton et al. | Mar. 8, 1949 |

Certificate of Correction

Patent No. 2,489,518                                           November 29, 1949

SAMUEL L. BURT

It is hereby certified that error appears in the printed specification of the above numbered patent requiring correction as follows:

Column 2, line 43, in the table, first column thereof, before the word "chloride" insert *vinyl*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*